United States Patent
Gerling et al.

(10) Patent No.: US 10,746,900 B2
(45) Date of Patent: Aug. 18, 2020

(54) SYSTEM AND METHOD FOR PIPELINE MANAGEMENT

(71) Applicant: Cylo Technologies Incorporated, Calgary (CA)

(72) Inventors: Darren Anthony Gerling, Calgary (CA); Jason Wayne Gerling, Calgary (CA)

(73) Assignee: CYLO TECHNOLOGIES INCORPORATED, Calgary (CA)

( * ) Notice: Subject to any disclaimer, the term of this patent is extended or adjusted under 35 U.S.C. 154(b) by 859 days.

(21) Appl. No.: 14/553,764

(22) Filed: Nov. 25, 2014

(65) Prior Publication Data

US 2016/0146971 A1    May 26, 2016

(51) Int. Cl.
*G01V 99/00*    (2009.01)

(52) U.S. Cl.
CPC .................... *G01V 99/00* (2013.01)

(58) Field of Classification Search
CPC ..................................... G01V 99/00
See application file for complete search history.

(56) References Cited

U.S. PATENT DOCUMENTS

| | | | | |
|---|---|---|---|---|
| 2001/0007203 A1* | 7/2001 | Goodman | ............. | G01N 29/045 73/1.82 |
| 2013/0211797 A1* | 8/2013 | Scolnicov | .............. | G06Q 50/06 703/2 |
| 2014/0311245 A1* | 10/2014 | Horoshenkov | ........ | G01N 29/11 73/592 |
| 2016/0252481 A1* | 9/2016 | Zheng | .................... | G01N 27/83 324/238 |

FOREIGN PATENT DOCUMENTS

WO    2014142929    9/2014

OTHER PUBLICATIONS

International Search Report and Written Opinion dated Mar. 2, 2016 in Application No. PCT/CA2015/051231.
Balogun, et al., "Geovisualization of Sub-surface Pipelines: A 3D Approach," Modem Applied Science, vol. 5, No. 4, Aug. 2011, pp. 158-165.
Mashford, et al., "An Approach to leak detection in pipe networks using analysis of monitored pressure values by support vector machine," IEEE Third International Conference on Network and System Security, 2009, 6 pages.
Wang, et al., "Pipeline Digitalization and Integrity Management," Proceedings of the International Conference on Pipelines and Trenchless Technology, pp. 1482-1490, Oct. 26, 2011, American Society of Civil Engineers.

* cited by examiner

*Primary Examiner* — Vongsavanh Sengdara
(74) *Attorney, Agent, or Firm* — Snell & Wilmer L.L.P.

(57) ABSTRACT

The ability to match multiple runs of inspection data to each other allows assets to be managed. Assets, such as defects in pipelines can be tracked across multiple inspection runs. The matching of defects allows the growth of defects in the pipeline to be tracked. The pipeline data system allows tracking of different assets including pipeline components, as well as managing documents including dig site reports.

18 Claims, 11 Drawing Sheets

SYSTEM AND METHOD FOR PIPELINE MANAGEMENT

TECHNICAL FIELD

This disclosure relates to data management and in particular to systems and methods for the management of pipeline data.

BACKGROUND OF THE INVENTION

Geographic information systems (GIS) allow geographic data to be presented visually, such as in a map view. Information about pipelines, such as the route of the pipeline, may be stored in a GIS. A GIS generally stores pipeline information using 2-dimensional (2D) coordinates. The GIS locates pipeline information using m-values, which provide locations as linear offsets from known coordinates. M-values use dynamic segmentation to locate assets. However the dynamic segmentation process s has large computation overhead making the managing of large datasets difficult. In order to process the large datasets generally associated with pipelines, the datasets are often preprocessed in order to cull a large portion of the data. Further, the use of m-values and dynamic segmentation often fails to provide accurate asset location, especially when applied to 3-dimensional (3D) topological data.

Legacy 2D GIS data can be converted to 3D coordinates, allowing pipeline assets to be located precisely in 3D. The 3D pipeline data may allow more precise locating of pipeline assets along a pipeline route.

BRIEF DESCRIPTION OF THE DRAWINGS

Various embodiments are described herein with reference to the appended drawings, in which.

DETAILED DESCRIPTION

Figure 1:
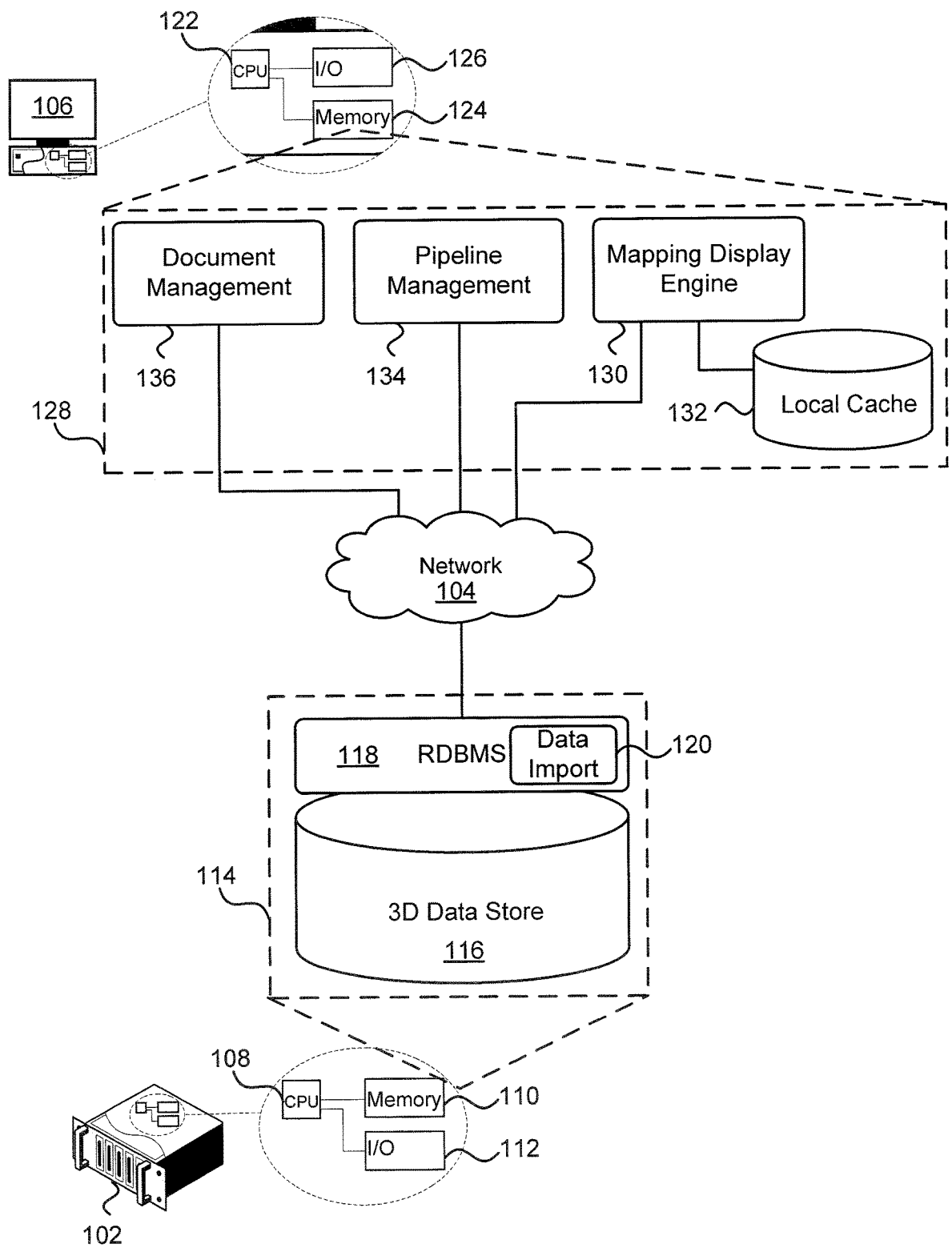
FIG. 1 depicts components of a pipeline management system, in accordance with various embodiments.

In accordance with various embodiments, there is provided a method for matching inspection data across multiple inspection runs of a pipeline, the method comprising: receiving at a processing system new inspection data comprising a plurality of measurements each associated with a distance the respective measurement was made; matching major pipeline features of the inspection data to a relevant portion of a 3D model of the pipeline stored in a database system to position the plurality of measurements along the relevant portion of the 3D model; matching one or more defects in the new inspection data to one or more defects in existing inspection data from a previous inspection run; linking the one or more defects in the new inspection data to the matched one or more defects in the existing data from the previous inspection run; and storing the new inspection data and the linking between the one or more defects in the database system with the 3D pipeline model.

In accordance with various embodiments, the method may further comprise: cleaning the received new inspection data to conform to a defined data definition.

In accordance with various embodiments, matching major pipeline feature of the new inspection data comprises: identifying major pipeline features comprising valves within the new inspection data based on measurement values within the new inspection data; and matching the identified major pipeline features to locations of corresponding features within the 3D pipeline model.

In accordance with various embodiments, matching the identified major pipeline features comprises: determining an estimated location of the identified major pipeline feature using distance information of the measurements the identification of the major pipeline feature was based on; determining a difference between the estimated location to a location of the corresponding feature within the 3D pipeline model; and matching the identified major pipeline feature when the determined difference is less than an threshold distance.

In accordance with various embodiments, the method may further comprise: soliciting user feedback on the matching when the determined difference is greater than, or equal to, the threshold distance.

In accordance with various embodiments, matching one or more defects in the new inspection data comprises: matching defects in the new inspection data and the inspection data of the previous inspection run based on a proximity and depth of the defects.

In accordance with various embodiments, matching defects further comprises: determining a deepest defect in a section of the new inspection data; determining a deepest defect in a section of the previous inspection data within a matching distance limit from the section of the new inspection data; and matching the deepest defect in the section of the new inspection data to the deepest defect in the section of the previous inspection data if a depth of the deepest defect in the section of the new inspection data is greater than or equal to a depth of the deepest defect in the section of the previous inspection data.

In accordance with various embodiments, matching defects further comprises: identifying the deepest defect in the section of the new inspection data to have grown from zero if the depth of the deepest defect in the section of the new inspection data is less than the depth of the deepest defect in the section of the previous inspection data.

In accordance with various embodiments, the method may further comprise: querying the 3D pipeline model using 3D spatial coordinates; receiving response data from querying the 3D pipeline model; generating a user interface to display the response data.

In accordance with various embodiments, generating the user interface display comprises: generating a 3D view of a split pipe view depicting defects specified the response data at a location on the split pipe view corresponding to a location of the defect in the 3D pipeline view.

In accordance with various embodiments, there is provided a processing system for matching inspection data across multiple inspection runs of a pipeline, the system comprising: a processing unit for executing instructions; a memory unit for storing instructions, which when executed by the processing unit, configure the system to: receiving at the processing system new inspection data comprising a plurality of measurements each associated with a distance the respective measurement was made; match major pipeline features of the inspection data to a relevant portion of a 3D model of the pipeline stored in a database system to position the plurality of measurements along the relevant portion of the 3D model; match one or more defects in the new inspection data to one or more defects in existing inspection data from a previous inspection run; link the one or more defects in the new inspection data to the matched one or more defects in the existing data from the previous inspection run; and store the new inspection data and the linking between the one or more defects in the database system with the 3D pipeline model.

In accordance with various embodiments, the instructions, which when executed by the processing unit, further configure the processing system to: clean the received new inspection data to conform to a defined data definition.

In accordance with various embodiments, wherein matching major pipeline feature of the new inspection data comprises: identifying major pipeline features comprising valves within the new inspection data based on measurement values within the new inspection data; and matching the identified major pipeline features to locations of corresponding features within the 3D pipeline model.

In accordance with various embodiments, matching the identified major pipeline features comprises: determining an estimated location of the identified major pipeline feature using distance information of the measurements the identification of the major pipeline feature was based on; determining a difference between the estimated location to a location of the corresponding feature within the 3D pipeline model; and matching the identified major pipeline feature when the determined difference is less than an threshold distance.

In accordance with various embodiments, the instructions, which when executed by the processing unit, further configure the processing system to: solicit user feedback on the matching when the determined difference is greater than, or equal to, the threshold distance.

In accordance with various embodiments, matching one or more defects in the new inspection data comprises: matching defects in the new inspection data and the inspection data of the previous inspection run based on a proximity and depth of the defects.

In accordance with various embodiments, matching defects further comprises: determining a deepest defect in a section of the new inspection data; determining a deepest defect in a section of the previous inspection data within a matching distance limit from the section of the new inspection data; and matching the deepest defect in the section of the new inspection data to the deepest defect in the section of the previous inspection data if a depth of the deepest defect in the section of the new inspection data is greater than or equal to a depth of the deepest defect in the section of the previous inspection data.

In accordance with various embodiments, matching defects further comprises: identifying the deepest defect in the section of the new inspection data to have grown from zero if the depth of the deepest defect in the section of the new inspection data is less than the depth of the deepest defect in the section of the previous inspection data.

In accordance with various embodiments, the instructions, which when executed by the processing unit, further configure the processing system to: query the 3D pipeline model using 3D spatial coordinates; receive response data from querying the 3D pipeline model; generate a user interface to display the response data.

In accordance with various embodiments, generating the user interface display comprises: generating a 3D view of a split pipe view depicting defects specified the response data at a location on the split pipe view corresponding to a location of the defect in the 3D pipeline view.

Once pipelines are installed, they must be maintained. This includes periodically inspecting the pipeline and its components as well as documenting work that has been conducted on particular sections. Information about the pipeline including its physical layout and route, may be stored in a Geographic Information System (GIS). Generally, a GIS stores pipeline information using 2-dimensional (2D) coordinates. Pipeline assets, which can broadly be considered as any component, feature and associated documents or information, including pipeline sections, valves, welds, test records, defects along with other possible data, may be located along a route of a pipeline using M-values and dynamic segmentation. The use of M-values and dynamic segmentation when used with a linear referencing, or stationing, data model of the pipeline introduces a large computation overhead, which may require discarding a large number of possibly relevant information in order to provide a system with acceptable performance characteristics.

2D GIS data can be imported into a 3D spatial data infrastructure that allows tracking pipeline assets with high precision. The 2D legacy data can be imported into the 3D spatial data infrastructure by overlaying the legacy 2D data over 3D topological information. The resultant 3D pipeline model locates pipeline assets with high precision, and provides spatial querying of pipeline assets and related information.

As described in further detail below, the 3D pipeline model allows pipeline inspection data to be imported and reconciled with 3D pipeline model. Assets in the 3D pipeline model, including defects identified from inspection data, may be uniquely identified in the 3D pipeline model. Other information such as dig site reports, construction reports, and maintenance reports may be associated with assets in the 3D pipeline model allowing for simplified querying of information in a geographic or topological context.

The 3D pipeline model provided by the spatial data infrastructure also allows pipeline inspection data, which is typically 1D data, to be incorporated into the spatial data infrastructure. The inspection data from multiple inspection runs can be compared in order to match defects across the runs, allowing the defects to be tracked over time. Further, the spatial data infrastructure allows querying of pipeline assets using spatial coordinates.

FIG. 1 depicts components of a pipeline management system. As depicted, the system 100 includes a computing device 102 that may provide various functionality for storing and manipulating 3D pipeline models. The computing device 102 is depicted as a single physical server for simplicity; however, it is possible to implement the computing device 102 as a number of co-operating physical computing devices. Further, a number of physical computing devices may be used to provide one or more virtual computing devices that may be used to implement the functionality described further herein. The computing device 102 may be coupled to a network 104, which may comprise one or more interconnected public and/or private networks. The network 104 allows the computing device to be accessed by one or more computing devices 106, which may be for example user computing devices. Although only one computing device 106 is depicted, it is contemplated that a number of computing devices may access the computing device 102.

The computing device 102 comprises a central processing unit (CPU) 108 that is capable of executing instructions in order to configure the computing device 102 to provide the functionality described further herein. The CPU 108 may be provided by one or more physical processing units, each of which may individually comprise one or more processing cores. The CPU 108 may communicate with memory unit 110, which stores both data as well as instructions for execution by the CPU 108. The memory unit 110 may comprise both volatile memory, including local memory and registers on the CPU 108, random access memory (RAM) coupled to the CPU and non-volatile memory, such as flash memory, solid state drives (SSD) and hard disk drives (HDD). The computing device 102 may further comprise one or more input/output (I/O) devices 112. The I/O devices 112 may be connected to one or more buses which are in turn connected to the CPU 108. The I/O devices 112 may include for example, output devices such as displays, speakers, network interfaces, printers, etc. as well as input devices such as keyboards, mice, microphones, cameras, etc.

The data and instructions stored in memory 110 include data and instructions for providing 3D spatial data infrastructure functionality 114. The 3D spatial data infrastructure can provide a 3D pipeline model, allowing geographic as well as topological querying of data associated with the pipeline model. For example, the 3D pipeline model may be displayed overtop of a topological map of the area the pipeline crosses. The 3D pipeline model may be queried in order to retrieve data associated with the model. For example, a query may be structured for retrieving, and presenting, data associated with a selected portion of the pipeline. The retrieved data may include for example historical records associated with the selected section of the pipe, test or inspection results of the section of pipe as well as other available data. The 3D spatial data infrastructure functionality 114 includes a data store 116 for storing the 3D pipeline model along with associated data. The 3D data store 116 may be managed by a relational database management system (RDBMS) 118. The RDBMS 118 may manage the 3D data store in accordance with a standardized architecture such as the Pipeline Open Data Standard (PODS), or may extend a standardized architecture such as PODS in order to provide enhanced functionality as described further herein. Additionally, the RDBMS may provide a custom architecture incorporating functionality described herein. The RDBMS 118 may include data import functionality 120 for importing data into the stored 3D data model. Although depicted as being provided within the RDBMS 118, it is contemplated that the data import functionality 120 may be provided externally from the RDBMS functionality 118. The data import functionality may be used to import legacy 2D pipeline data and combine it with 3D topological information in order to create an initial 3D pipeline model from the legacy data. Additionally, the data import functionality may be used for importing data such as 1D inspection data into the 3D model.

The 3D pipeline model may be accessed by the computing device 106. The computing device 106 may provide a user interface for interacting with the 3D pipeline model. The computing device 106 comprises a central processing unit (CPU) 122 that is capable of executing instructions in order to configure the computing device 106 to provide the functionality described further herein. The CPU 122 may be provided by one or more physical processing units, each of which may individually comprise one or more processing cores. The CPU 122 may communicate with memory unit 124, which stores both data as well as instructions for execution by the CPU 122. The memory unit 124 may comprise both volatile memory, including local memory and registers on the CPU 122, random access memory (RAM) coupled to the CPU and non-volatile memory, such as flash memory, solid state drives (SSD) and hard disk drives (HDD). The computing device 106 may further comprise one or more input/output (I/O) devices 126. The I/O devices 126 may be connected to one or more buses which are in turn connected to the CPU 122. The I/O devices 126 may include for example, output devices such as displays, speakers, network interfaces, printers, etc. as well as input devices such as keyboards, mice, microphones, cameras, etc.

The data and instructions stored in memory 110 may include data and instructions for providing various functionality 128 for interacting with the 3D pipeline model. The functionality 128 is depicted as being provided by mapping display engine functionality 130, pipeline management functionality 134, and document management functionality 136. Although depicted as separate functionality, the depicted functionality may be combined together, or provided by additional interacting components. Further, although the functionality 128 is depicted as being provided by the same computing device 106, the functionality may be implemented by one or more separate computing devices, including, for example, the computing device 102.

Turning to the functionality 114 implemented by the computing device 102, the RDBMS functionality 118 maintains the 3D pipeline model in the 3D data store 116. Rather than using absolute geodetic co-ordinates, the 3D pipeline model stores asset location information by adding elevation information to traditional spheroid coordinates, such as latitude and longitude. Locating pipeline assets in the 3D model using 3D coordinates eliminates the need for, and associated overhead and imprecision with, dynamic segmentation and M-values often used with a linear referencing model to locate assets. The use of 3D coordinates for assets may increase query complexity, which may be problematic when used with large datasets that are common for pipelines. In order to reduce query complexity, globally unique identifiers (GUIDs) may be associated with assets and used for cross-referencing assets. The association of GUIDs with assets allows relationships in existing architectures, such as PODS, to inherit spatial context from the associated assets, which may greatly reduce the query complexity, since each individual asset does not need to be retrieved using spatial information.

As described above, the 3D pipeline model stores the pipeline information in a format that allows spatial querying of the assets. The assets may broadly be viewed as for example welds, valves, and defects in the pipe. In addition to the asset information, the 3D pipeline model may also store documents and other related information associated with the pipeline. The 3D data model allows the stored documents to be cross referenced with assets by locations. Illustrative documents may include, for example, construction records, inspection reports, dig site reports as well as other information. Depending upon the underlying technology providing the RDBMS functionality, the documents may be stored as blobs outside of the database itself. For example SQL Server supports FILESTREAM functionality that allows the documents to be stored externally from the database. If the underlying RDBMS functionality does not support the required FILESTREAM functionality, the documents may be stored within the database itself, or externally using links. In the 3D pipeline model, physical assets are associated with GUIDs. The documents may be associated with GUIDs as well. Links between documents and assets may be abstracted as a GUID:GUID relation. The GUID: GUID relationship allows a document to be associated with multiple assets. For example, a dig site report may be associated through a number of GUID:GUID relationships to a plurality of welds in order to cover the pipeline section that the dig site report relates to. The GUIDs described above may be provided in various manners, including for example a 38 character-string, which is a native data type in SQL server. The 3D pipeline model may allow, for example, looking up of documents and their associated pipeline assets when a user clicks on a map or selects a section of the pipeline on the map.

The 3D pipeline model provided by the RDBMS functionality and the 3D data store may be generated by importing 2D legacy pipeline data. The data import functionality 120 may provide the functionality for importing the 2D legacy pipeline data and combining it with 3D topology data to provide the 3D pipeline model. The data import functionality 120 may also be used to import 1D inspection data into an existing 3D pipeline model.

As described above, 2D data may be imported into the 3D model by adding elevation data to the 2D spheroid coordinates. For example, elevation data from the topological information may be overlaid in 1 meter segments onto a centerline of the pipeline route described in the legacy 2D data. When importing data and converting the 2D data to 3D data, a mixed-initiative algorithm may be used. The mixed initiative algorithm attempts to locate assets correctly in 3D and makes use of user input to focus matches of assets and locations and correct possible errors. The mixed-initiative algorithm traverses the pipeline described by the legacy 2D data being imported and compares 2D legacy data with 3D topographic data in order to locate the assets in 3D. The algorithm unifies objects, infers elevations using 3D topological information, and adjusts co-ordinates. The 3D pipeline model may be stored in the data store.

When data is being imported, the assets may be assigned a GUID. However, non-sequential GUIDs may slow record creation when adding information to the 3D data model maintained by the RDBMS functionality depending upon the RDBMS implementation. A data service may be provided for the database to generate sequential GUIDs for assets as they are imported. The 3D data model provides sufficient speed in importing data into the model to allow importing substantial portions of data records without filtering the data. Previous GIS solutions often required discarding more than 75% of possible data.

The 3D pipeline model maintained by the RDBMS functionality may be accessed by users through one or more computing devices, such as computing device 106. The computing device may provide a user interface for querying and modifying the 3D pipeline model. The functionality provided by the computing device 106 may include mapping display engine functionality 130. The mapping display engine functionality may provide a graphical user interface that displays a representation of the 3D pipeline model and allows for a user to interact with the displayed model in order to retrieve information. As an example, the mapping display engine may display a topological map along with an overlay of the pipeline location. A user may use the interface to select a portion or component in order to view associated information. As one example, a user could select a portion of the displayed pipeline and view documents that are associated with the selected portion. The interface may display the pipeline information in a textual representation, in a graphical representation or combination thereof.

The mapping display engine may retrieve the 3D pipeline information directly from the RDBMS functionality, or it may alternatively retrieve relevant portions of the 3D pipeline model and cache the information locally in a local cache 132. Caching a large number of records, such as 20,000 or more, may be relatively slow as a result of the large number of INSERT commands required. It is possible to increase the speed of the process by first combining a large number of records, for example 50,000, together for inserting into the cache database using a single INSERT command. Although grouping the records together prior to the INSERT command requires processing, the overall speed of processing the records for inserting using a single INSERT command and subsequently inserting the grouped records may provide a significant speed increase.

The pipeline management functionality 134 may provide various functionality for managing the 3D pipeline including, for example importing inspection data. Inspection data is typically 1D data corresponding to measurements taken along a length of the pipeline. Inspection data may be obtained periodically, for example once a year. The inspection data may be matched to previous inspection data in order to track changes in the pipeline. The functionality 128 may also include document management functionality 136. The document management functionality 136 may allow a user to incorporate documents, such as construction logs, maintenance logs, component documentation, dig reports as well as other information into the 3D data model. As described above, documents may be associated with assets in the 3D data model via one or more GUID:GUID relations.

Figure 2:
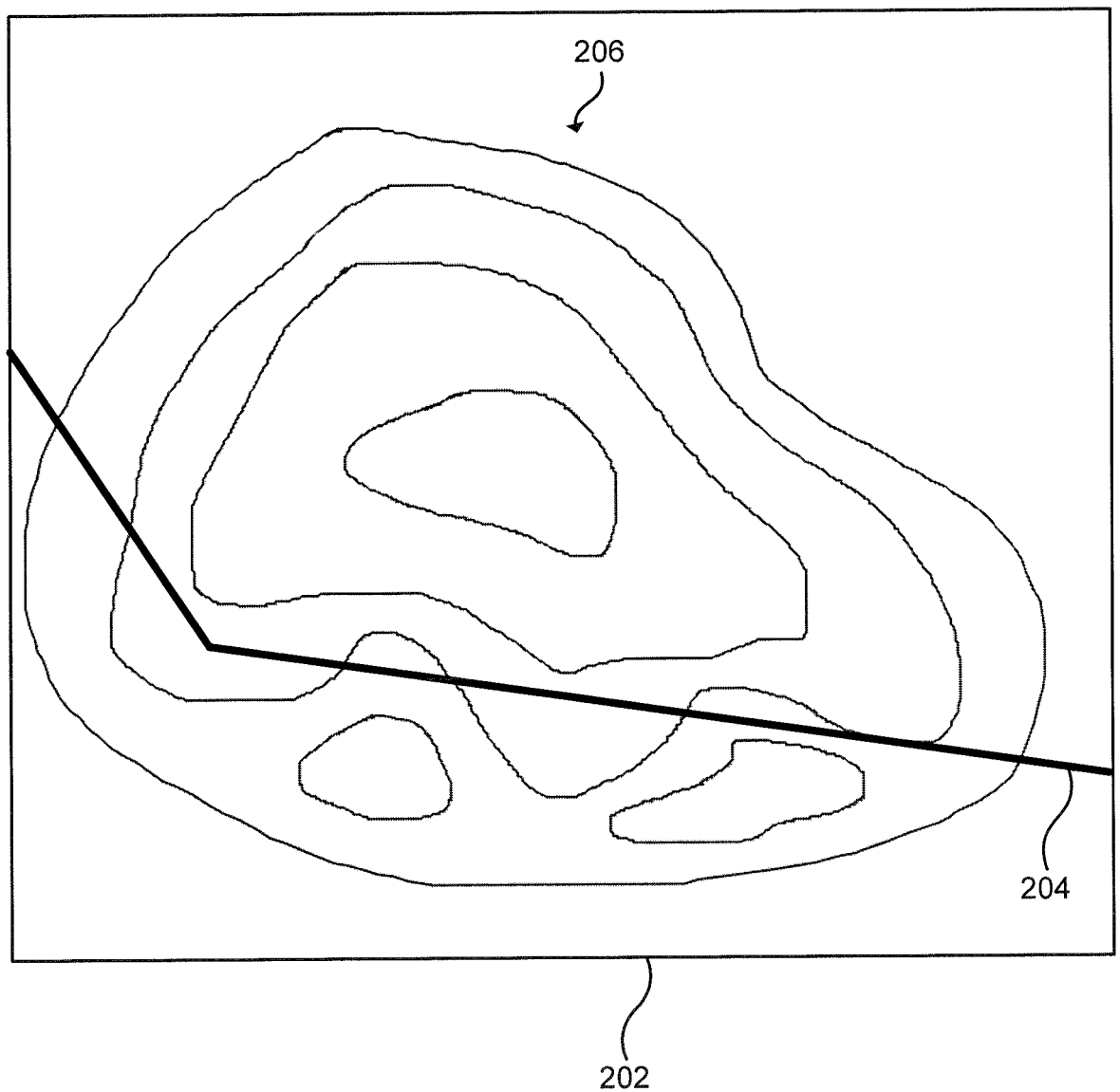
FIG. 2 depicts an illustrative pipeline route overlaid on a topological map, in accordance with various embodiments.

FIG. 2 depicts an illustrative pipeline route overlaid on a topological map. The display 202 may be generated by the mapping display engine functionality. The display 202 may comprise a representation of the pipeline route overlaid on top of topological data 206. Although the display 202 is depicted as displaying the pipeline route overtop of topological data, other representations of the 3D data model may be provided. For example, the mapping display engine functionality may overlay the pipeline route over a 2D geographic map, or may generate a 3D representation and allow the user to navigate the pipeline in 3D. With the pipeline displayed as depicted, a user may zoom in on selected portions and view more detailed information about assets. As an example, a user could zoom-in on a section of pipe that includes a valve. Clicking on the valve may retrieve and display the associated documentation for the particular valve. The documentation may include for example information on the valve type, the date it was installed, and information on the inspection history of the valve.

Figure 3:
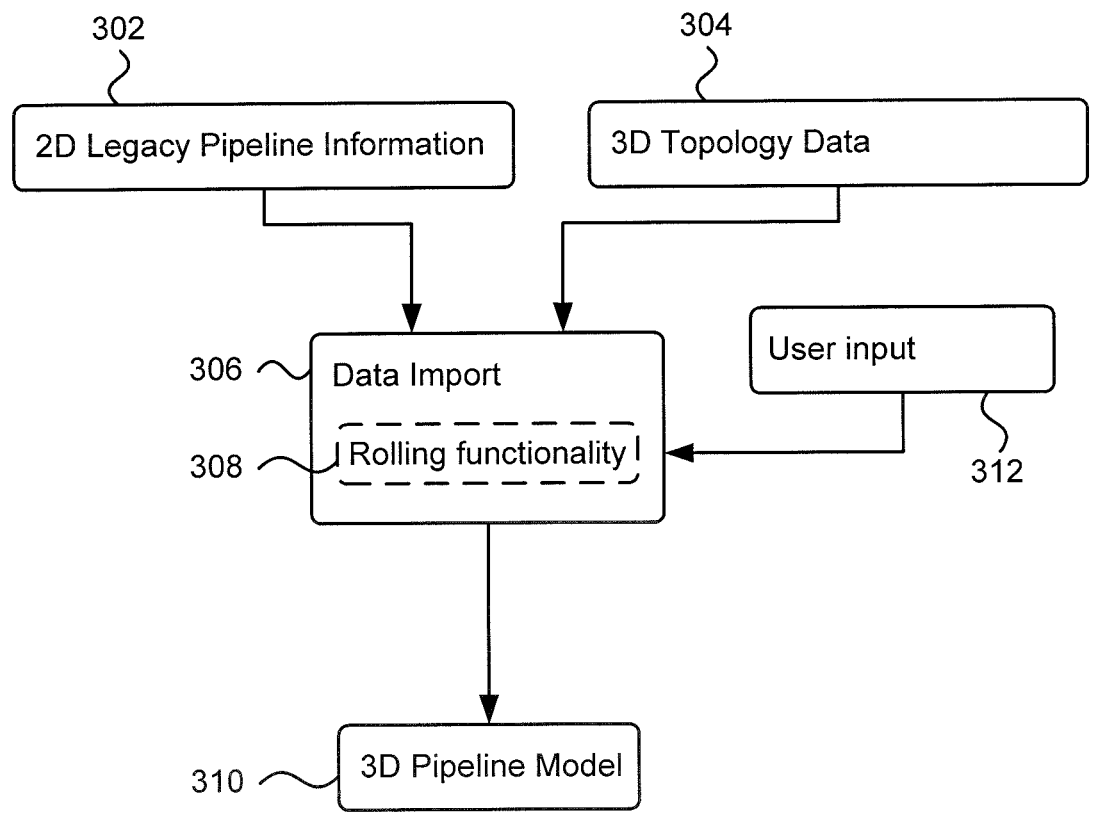
FIG. 3 depicts functionality for importing 2D legacy data into a 3D pipeline model, in accordance with various embodiments.

FIG. 3 depicts functionality for importing 2D legacy data into a 3D pipeline model. Data import functionality 306 may receive 2D legacy pipeline information 302, combine it with 3D topology data 304 in order to generate the 3D pipeline model 310. As described above, 2D legacy data may specify pipeline routes using M-values describing an offset from a known location. The data import functionality 306 may use rolling functionality 308 that 'rolls' the data being imported, such as the 2D legacy data, onto 3D data, such as the 3D topology data. The rolling functionality 308 determines the latitude and longitude for assets in the 2D legacy data 302 and adds elevation information to the coordinates according to the 3D topological data 304. Once the 2D legacy data is combined with the 3D topological data, the 3D pipeline model may be stored using for example the RDBMS functionality described above. When importing 2D legacy data, the pipeline data is traversed from one location to another, and the location information is overlaid with the topological data along the pipeline centerline, for example at 1-meter intervals.

As described further below, in addition to importing 2D legacy pipeline data, the data import functionality may also be used for importing inspection data into the 3D pipeline model. The inspection data may be obtained from an inspection device that traverses the pipeline. The 3D pipeline model, including the location of assets may be updated, and its precision improved, using newly available data such as inspection data.

Figure 4:
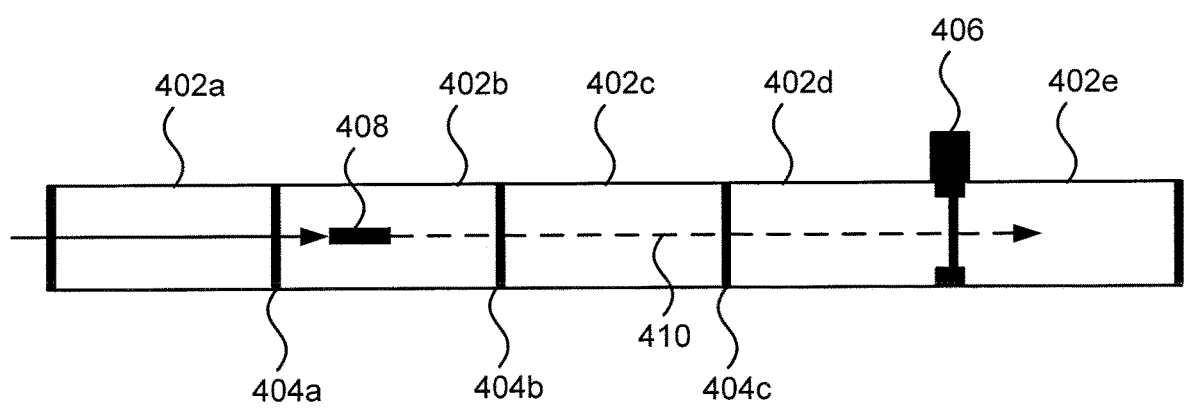
FIG. 4 depicts inspection of a pipeline, in accordance with various embodiments.

FIG. 4 depicts inspection of a pipeline. A portion of the pipeline 400 is comprised of a number of pipe sections 402a, 402b, 402c, 402d, 402e (referred to collectively as pipe sections 402). Each of the pipe sections 402 are joined together at weld joints 404a, 404b, 404c (referred to collectively as weld joints 402). In addition to the joined pipe sections 402, the pipeline may also include a number of valves 406 or joints, such as Y-joints etc.

The inspection data may be collected by a pipeline inspection gauge (PIG) 408 that passes through the pipes as depicted by arrow 410. The PIG 408 includes one or more measurement devices that take measurements as the PIG 408 proceeds through the pipe. The PIG tracks the distance the PIG has travelled and associates the distance travelled with the measurements. Accordingly, the inspection data, which is often referred to as in-line inspection (ILI) data, comprises one or more measurement values associated with a respective distance the measurement was taken from a starting location.

The PIG 408 may measure magnetic flux leakage (MFL) along pipeline walls. Valves, weld joints and corrosion defects all have distinct signatures that allow the particular asset to be identified within the MFL data. Readings from tri-axial Hall effect sensors of the PIG may be used to triangulate an assets' radial position within the pipe. Defects may be reported as a percentage of wall loss, which may be considered as a depth. ILI tools can detect loss to a precision of 5%, but data is generally deemed reliable at 10%. Once collected, the ILI data may be processed and imported into the 3D pipeline model by matching physical components, such as welds and valves, that can be identified within the ILI data to the corresponding components in the 3D model.

Figure 5:
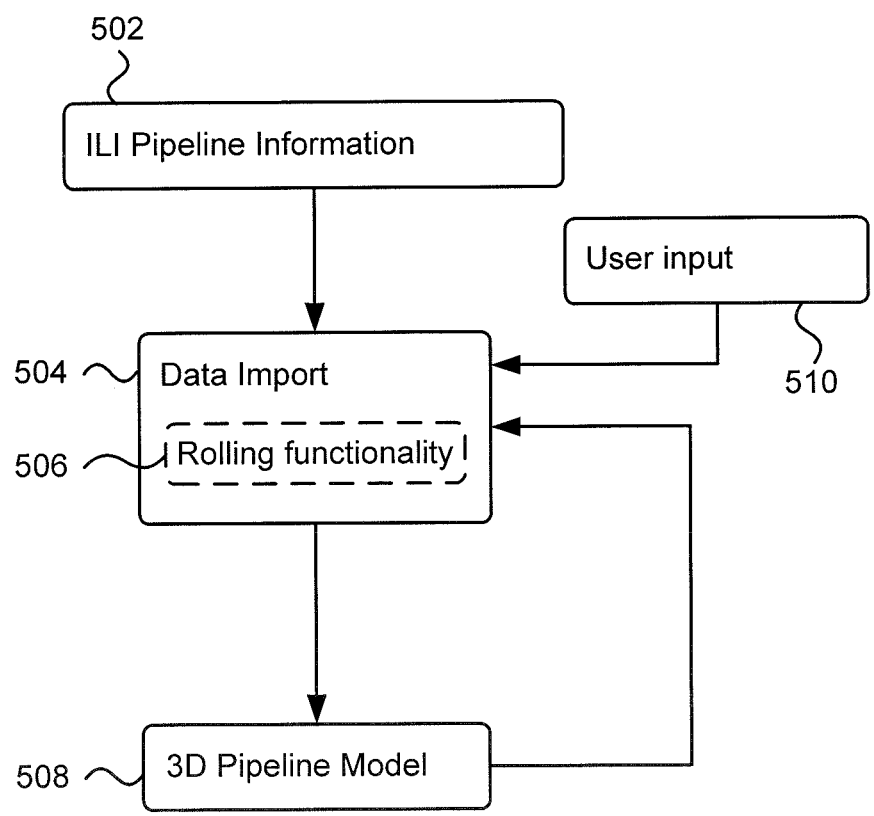
FIG. 5 depicts functionality for importing inspection data into a 3D pipeline model, in accordance with various embodiments.

FIG. 5 depicts functionality for matching inspection data from multiple inspection runs. The data import functionality 504 is similar to the data import functionality 306 described above. However, rather than combining 2D pipeline data with 3D topological data, the data import functionality 504 maps the 1D ILI data 502 onto the existing 3D pipeline model 508. The data import functionality 504 may include rolling functionality 506, similar to the rolling functionality 308 described above. The rolling functionality 506 rolls the 1D ILI data along the 3D pipeline model and matches major pipeline features that can be identified in the ILI data with the corresponding components within the pipeline model. That is, welds identifiable within the ILI data are 'rolled' onto the pipeline model and matched up with corresponding pipe joints within the pipeline model. Rather than linking matched components using GUID:GUID relations, an abstracted relationship of REF_EVENT_GUID may be used to link physical components in the pipeline model with the ILI events, such as detected ILI signature, of the components. The abstracted relationship allows tentatively linking an ILI event to a physical asset in the 3D pipeline model and re-linking the events and assets as required without disrupting the pipeline model. Once the ILI data is matched to the 3D pipeline model, it is possible to identify the location of defects within the pipeline. Incorporating ILI data from multiple inspection runs allows the growth of defects to be tracked through the pipeline.

Figure 6:
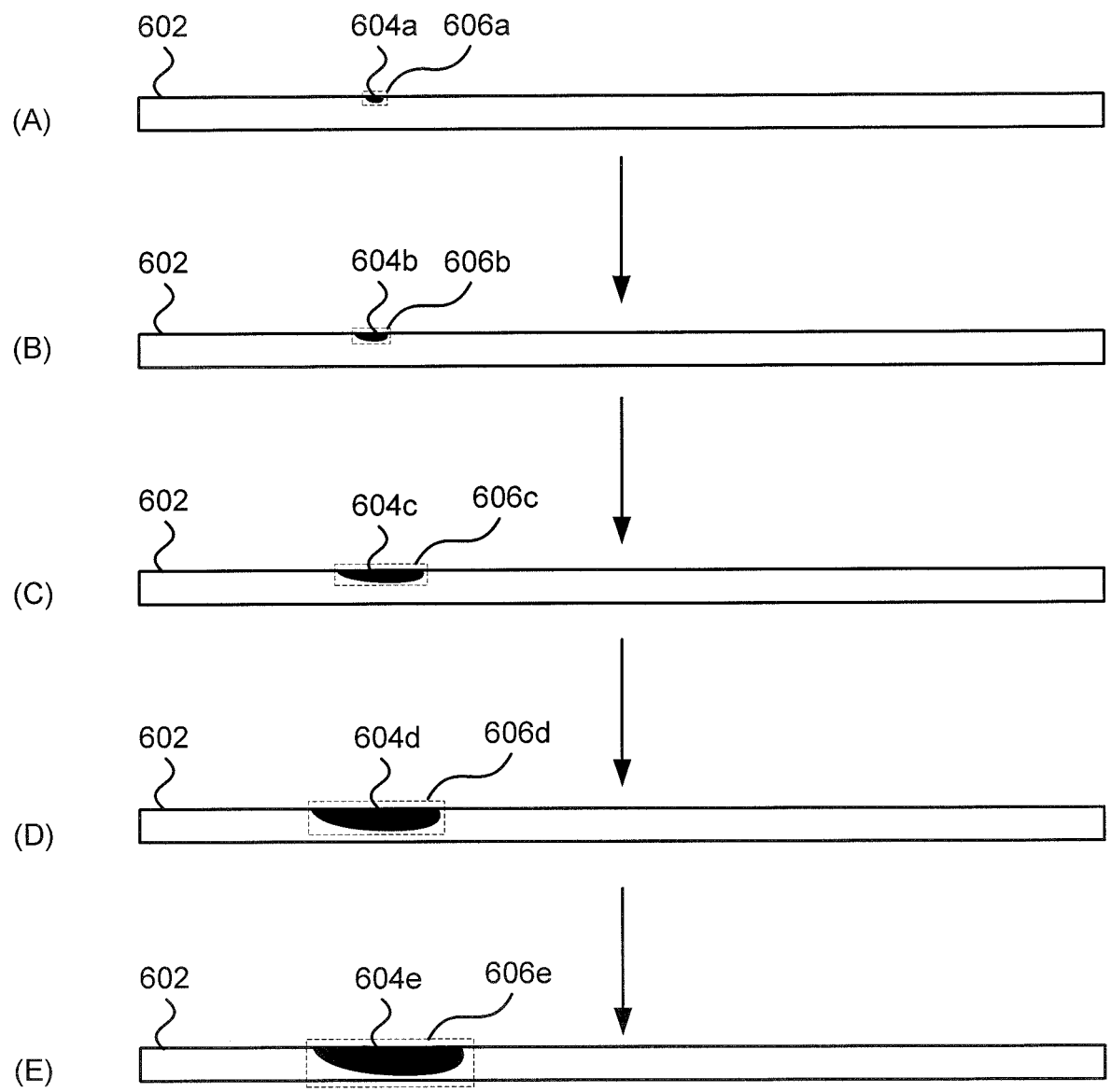
FIG. 6 depicts growth of a defect in a wall of a pipe, in accordance with various embodiments.

FIG. 6 depicts growth of a defect in a wall of a pipe. FIG. 6 depicts a representation of ILI data taken from a number of different inspection runs (A), (B), (C), (D), (E) obtained subsequent to each other, for example once every year. As depicted in each run, a pipe or section of pipe 602 includes a defect that grows in between each inspection run. That is, the defect, which may be a section of the pipe that has a particular thickness, grows from a small defect 604a, to larger defects 604b, 604c, 604d, 604e (referred to collectively as defect 604). Defects typically increase in depth and grow larger as depicted through defects 604a, 604b, 604c, 604d, 604e. If the corresponding defect in each of the runs of ILI data can be matched to each other, the growth of the defect over time can be tracked by the 3D pipeline system.

Measurement information from an ILI run may be processed manually by a professional in order to identify ILI events, such as detected signatures of welds, valves, defects, etc. The processed ILI measurement information may be formatted as ILI data that provides information, including distance from a starting point, associated with events in the ILI measurements. The ILI data may be formatted as a spreadsheet of information and may include thousands or tens of thousands of rows of data. As depicted in FIG. 6, the ILI data may provide an indication of defects as a start and end location which may be viewed as a bounding box of the defect 606a, 606b, 606c, 606d, 606e (referred to collectively as bounding boxes 606). When matching defects across multiple ILI data, defects may be linked to each other if the position of two bounding boxes 606 of different runs overlap with each other once the ILI data is positioned on the 3D model.

To track defect growth, ILI data from multiple ILI runs is compared. If all runs began from the exact same starting point of the pipeline, and if odometers of the measurement devices were perfectly accurate and precise, comparison between ILI runs would be straightforward. However, in practice, starting points differ across runs, and the odometers of the measurement devices are not perfectly accurate or precise. Accordingly, matching defects across multiple ILI runs depends on matching components and defects inferred from MFL data of the ILI runs. The ILI data is matched by first attempting to match each ILI run to an authoritative 3D pipeline model, using major pipeline features such as valves and welds as key matching points. Once the ILI data of a run is positioned on the 3D pipeline model, a second process locates defects in the 3D pipeline model and matches defects across the different ILI data runs.

Figure 7:
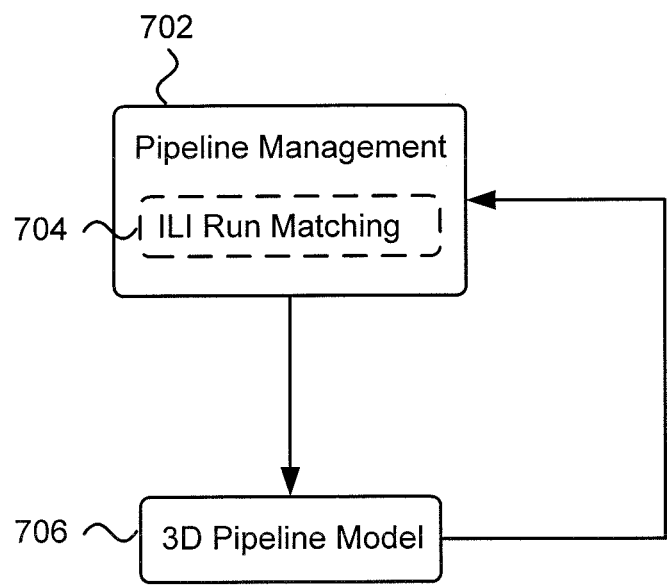
FIG. 7 depicts functionality for matching inspection data from multiple inspection runs, in accordance with various embodiments.

FIG. 7 depicts functionality for matching inspection data from multiple inspection runs. As depicted in FIG. 7, pipeline management functionality 702 may include ILI run matching functionality 704 for matching defects across multiple ILI runs. In FIG. 7, it is assumed that the ILI data to be matched has already been positioned, at least initially, on the 3D model. Accordingly, the ILI run matching functionality 704 retrieves the previously positioned ILI data and attempts to match defects across multiple runs. Various techniques may be applied for matching defects across multiple runs as described further below.

Generally, ILI runs can cover 10's of km and include millions of data points. Given the computational complexity of matching inaccurately projected data, previous 2D systems could not ingest entire runs and often 75-90% of the ILI data was discarded. The current 3D data system allows substantially all of the ILI data to be ingested. Although the ILI data may ingest more data, the ILI reports often have extreme variability in data format, and errors in mapping pipeline centerlines that make importing 100% of the data difficult in real-world environments.

ILI data may arrive in possibly multiple Excel spreadsheets, split across multiple tabs and files. Each company, and even each ILI report may uses a different format. Engineers may modify spreadsheets for sections of pipe they manage, rearranging and/or reformatting columns, and inserting idiosyncratic, but possibly significant annotations. For example, one engineer might position defects on a 12- or 24-hour clock face, while another use degrees or radians. Different units, such as meters or feet, may appear in the same column. Units may be embedded inside a number field. During the importation of ILI data for matching, the ILI data is first cleaned in order to be in a standardized format for importing and matching. Much of the cleaning process may be automated; however some user input may be required in order to place subjective information such as an engineer's notes into a common format. Once the ILI data is cleaned and in a suitable format it can be imported into the 3D model and positioned within the model and matched to previous ILI data.

Figure 8:
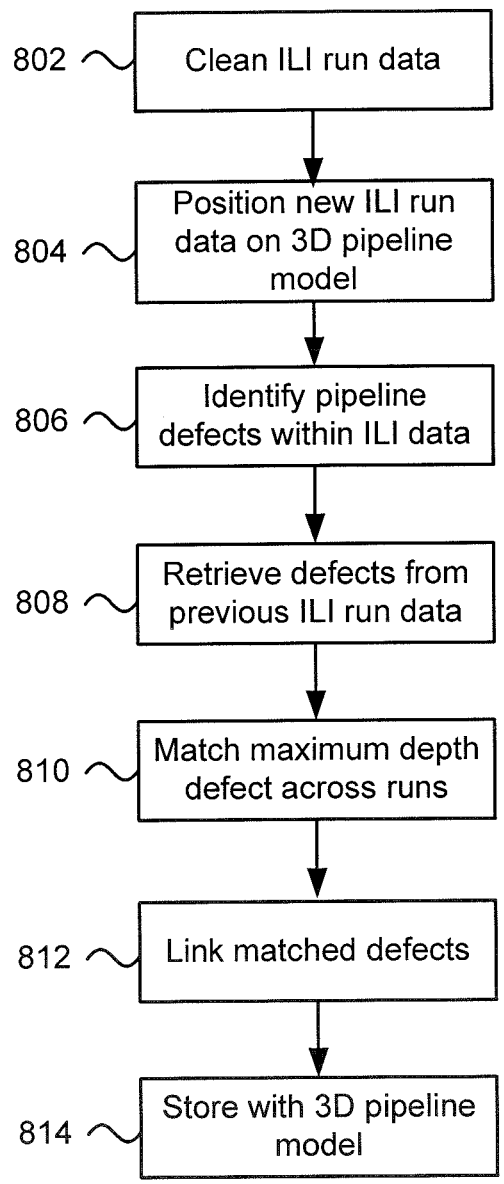
FIG. 8 depicts a method for matching inspection data from previous runs, in accordance with various embodiments.

FIG. 8 depicts a method for matching inspection data from previous runs. The method 800 may be used to compare and match defects within new ILI data to previous ILI data. The method 800 may be used in a "chaining process" whereby defects are matched to each other over multiple ILI data runs. A defect from one ILI run is 'chained' to a matching defect from an immediately previous ILI run. Thus, if the method matches defect X in run 1 to defect Y in run 2, and defect Y to defect Z in run 3, it infers that defect Z originated and grew from defect X and as such the three matched defects may be linked together. In order to reduce the number of possible defects that are required to be considered during the matching process, defects may be clustered together and the matching processed based on the clusters. Further, the matching may be simplified by focusing only on the defects having the greatest depth. In particular, the defects may be matched by matching a maximum depth defect in one run with a maximum depth defect in a previous run, in instances where more than one defect is matched together The matching is based on the assumption that the depth of defects increase over time and that the defect with a maximum depth in one ILI run is likely to have the maximum depth in a previous, or subsequent run. As ILI data is imported and matched, relevant defects can be added to the 3D pipeline model in order to provide an authoritative model of the pipeline. The 3D pipeline may include information about matched defects that have been matched across multiple ILI runs, as well as unmatched defects that have not been matched to previous ILI data.

The method 800 begins with receiving and cleaning ILI data (802) from an inspection run. Although ILI data may be provided in various formats, it is often received in one or more spreadsheet files that include the data in a number of columns and rows across multiple tabs. The data may be cleaned by renaming columns to match expected headings and converting units as required in order to place the file or files into an acceptable format. The ILI data provides distance information associated with detection events from ILI measurements. The ILI data identifies the location of pipeline assets such as valves, welds as well as defects.

Once cleaned, the ILI data may positioned on the 3D pipeline model (804). The 3D pipeline model provides location information of pipeline components, such as welds, valves, etc. These components are associated with respective signatures that can be identified in the ILI measurements. The identified components in the ILI data may then be matched to corresponding components in the 3D pipeline model. Once the ILI data is positioned relative to the 3D model, potential defects may be identified within the ILI data (806). The defects identified may be a result of numerous defects within the pipeline, however may be considered as a decrease in the thickness of the wall of the pipe.

Once the defects are identified in the current ILI data, defects from the previous ILI run data are retrieved (808). The previous defects may be retrieved from the 3D pipeline model itself, which may include the defect information from previous ILI runs, or may be retrieved from stored ILI data that is separate from the 3D pipeline model. The method matches a defect with a maximum depth from the new ILI data at a particular location, A, along the pipeline to a defect with the deepest depth from the previous ILI data at a location, A', along the pipeline. The distances between the two locations A and A' are within a location matching precision limit of each other. Accordingly, the method matches defects across previous ILI runs based on the depth of the defects and their position. Once defects are matched to each other, the defects across the multiple runs may be linked to each other (812). The linking of defects may be accomplished using GUIDs. The GUIDs may be linked to each other directly, or may be linked to each other through an abstracted relation. The 3D pipeline model may be updated to include the matched defects (814). In addition to matching the defects with the maximum depth, the 3D pipeline model may also be updated to include unmatched defects.

The method 800 provides an updated 3D pipeline model by updating the model using ILI data from new inspection runs. As described further below with reference to FIG. 9, the authoritative 3D model may be based on a comparison of multiple ILI runs and matching of defects across the multiple runs, rather than matching defects from the newest and immediately previous ILI runs.

Figure 9:
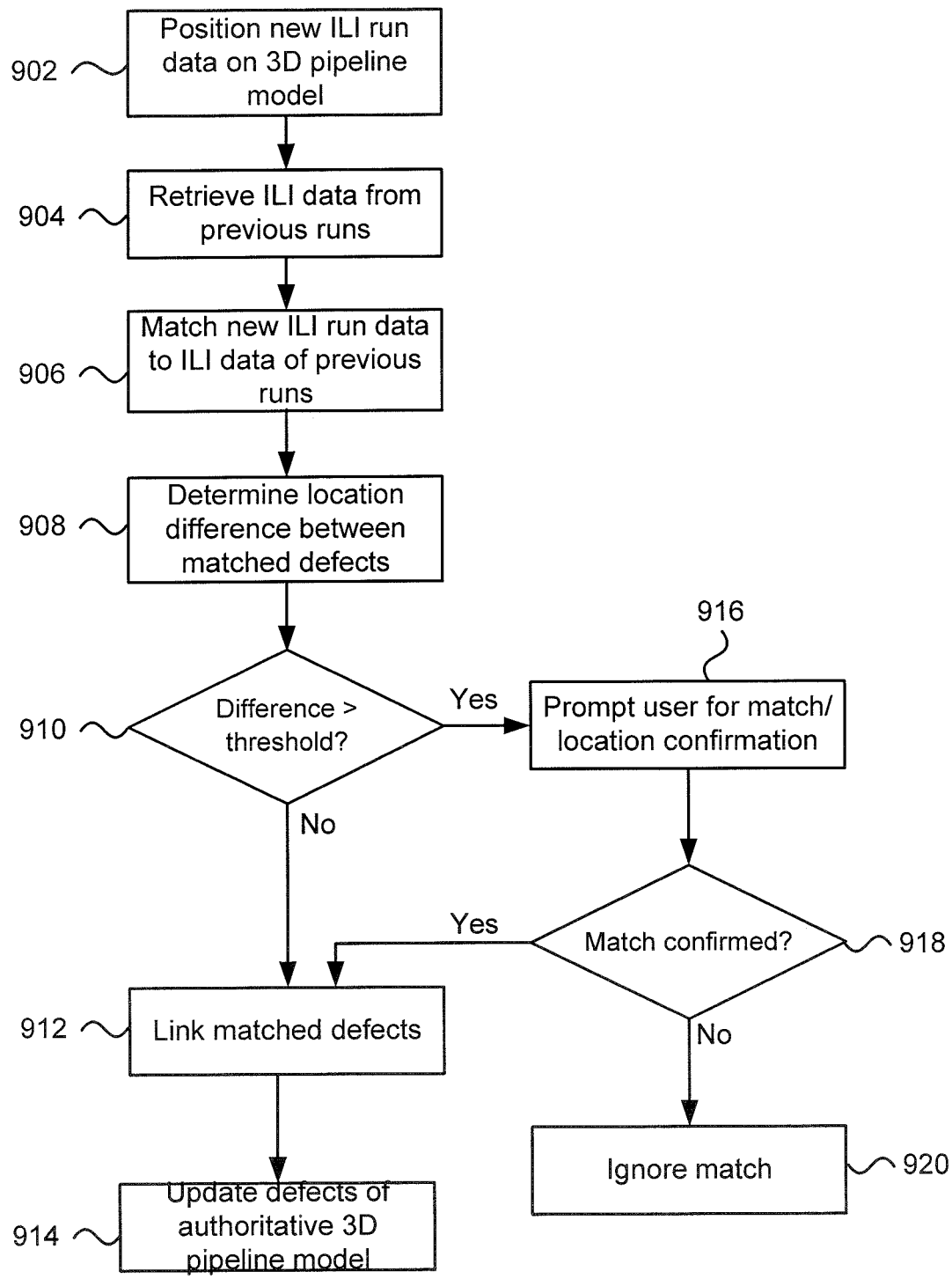
FIG. 9 depicts a further method for matching inspection data from previous runs, in accordance with various embodiments.

FIG. 9 depicts a further method for matching inspection data from previous runs. The method 900 includes positioning new ILI data onto the 3D pipeline mode (902). Although not depicted in FIG. 9, the ILI data may first be cleaned as described above with reference to FIG. 8. Positioning the ILI data onto the 3D pipeline model provides location information for the defects of the ILI data. The ILI data from previous runs, which have also been positioned relative to the 3D pipeline model, are retrieved (904). The ILI data may be retrieved from multiple previous inspection runs. The method 900 attempts to match corresponding defects across the multiple ILI runs (906). The matching may be based upon the depth of the defects and their position, that is the defects are within a threshold distance of each other.

Once potential defects are matched, the locations of the defects on the pipeline are determined, and the difference between the locations calculated (908). The method determines if the location of the matched defects are within a threshold of each other (910). If the matched defects are within the threshold of each other (Yes at 910), for example all of the defects are within 1 meter of each other, the matched defects are linked (912) together, and the location of the defects used to update the 3D pipeline model to include the defect information at the location (914).

If it is determined that the matched defects are not within the threshold of each other (No at 910), the user is prompted for information on the matched defects as well as the location of the defects (916). The user may be presented with the matched ILI data to review and may select defects to be matched across the multiple ILI runs, and may provide input on how to determine the location of the matched defects. For example, one of the defects may be selected for the location, or alternatively, the location may be selected as a weighting of the location of one or more of the matched defects. Once the user input is received, it is determined if the matched assets have been confirmed or whether the user has indicated that the defects are not matches (918). If the match between the defects is not confirmed (No at 918), the match is ignored (920) and the processing continues with matching other defects. If the match is confirmed (Yes at 918), the matched defects are linked to each other (912) and the 3D pipeline model is updated based on the location provided by the user (914).

As described above, inspection data from multiple inspection runs may be processed in order to match defects and position the defects onto the 3D pipeline model to provide an authoritative model of the pipeline including the defect information.

Figure 10:
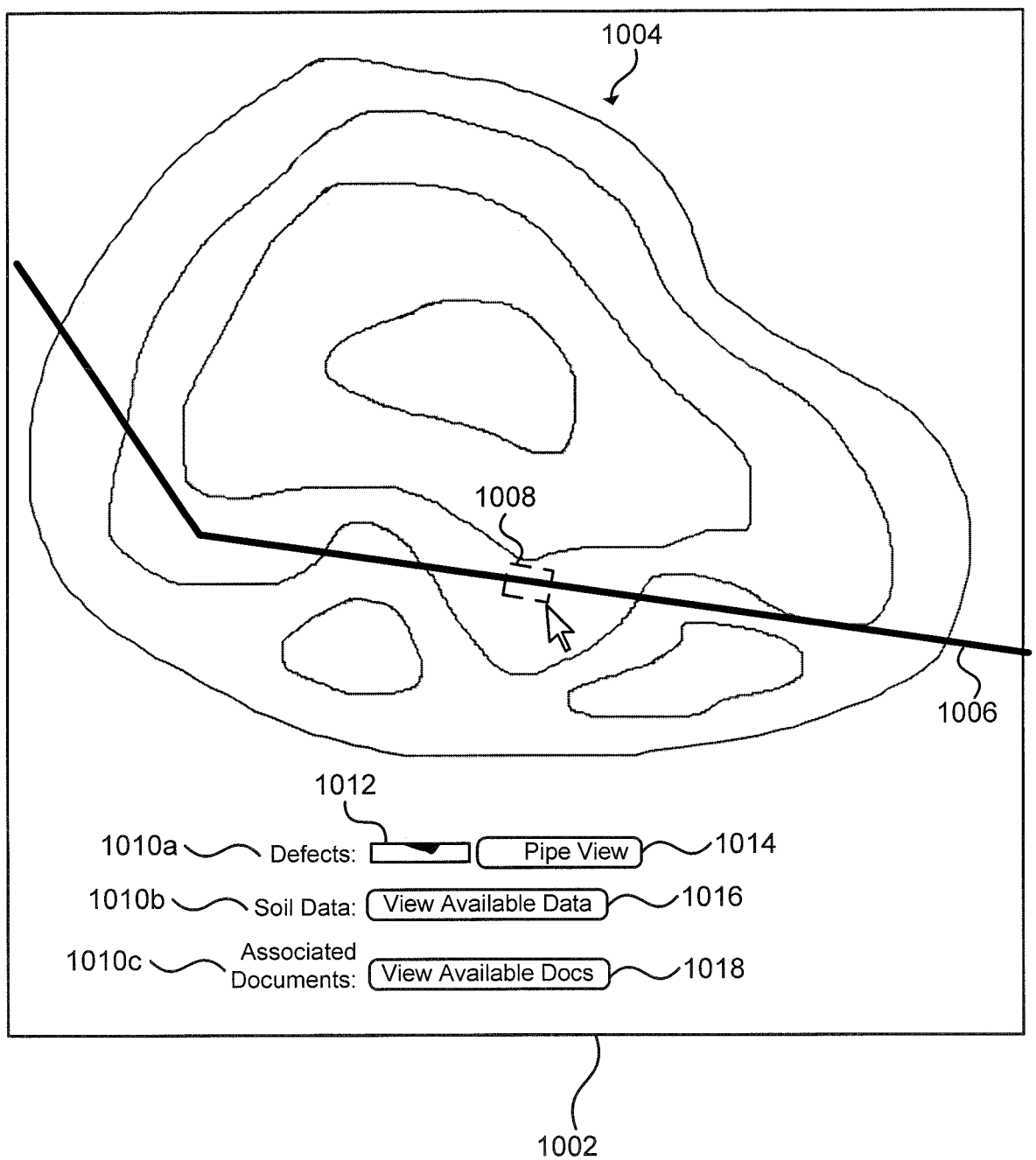
FIG. 10 depicts an illustrative map and pipeline data display, in accordance with various embodiments.

FIG. 10 depicts an illustrative map and pipeline data display. The authoritative 3D pipeline model may be queried in order to provide a user interface to the user. As depicted, the display 1002 may present an representation of topological information 1004 including the overlay of the pipeline 1006. The user interface may allow the 3D pipeline model to be queried and provide information in a number of ways. As one example, a user may select a portion 1008 of the pipeline, for example by using a mouse or other pointing device. Upon selecting the portion of the pipeline, the 3D pipeline model is queried to retrieve desired data for display to the user. Although the returned data may vary, as depicted in FIG. 10, the data may include information on defects 1010a, soil data available from dig site reports 1010b, and any associated documents 1010c. As an illustrative example of displaying the data from the data model, the defect information may be presented in a schematic form 1012. The user may also be presented with an button or icon for viewing a pipeline view of the selected pipe section. Similarly, the soil data may be presented in line, or the user may be presented with a button to view the available data 1016, which may be presented in a sub window. Any associated documents may also be presented to the user, either displaying icons or as a button to show the associated documents.

Figure 11:
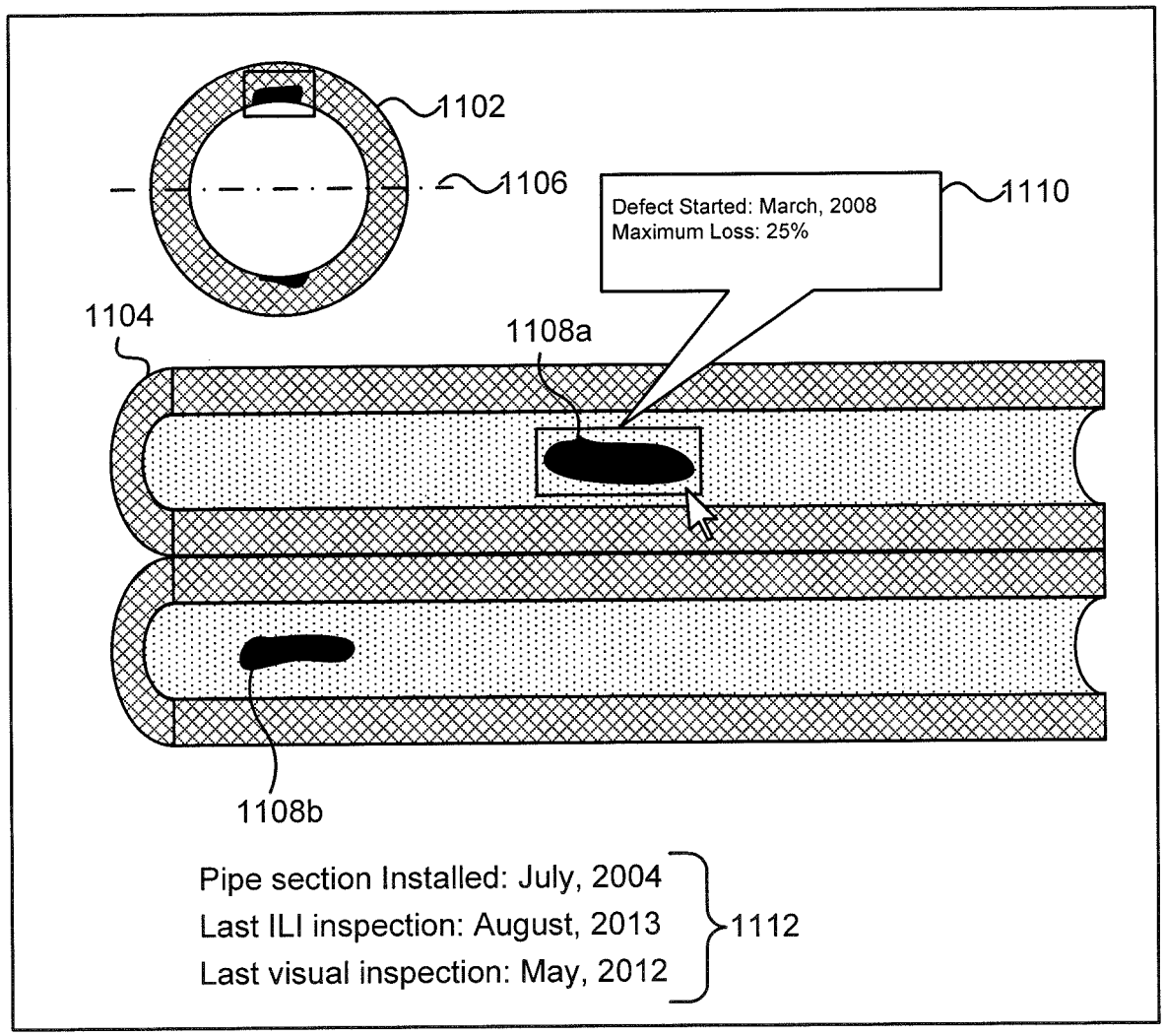
FIG. 11 depicts a further possible representation of pipeline information, in accordance with various embodiments.

FIG. 11 depicts a further possible representation of pipeline information. The pipeline view 1100 provides information for a selected section of pipe. The pipe may be depicted as a cross section view 1102 and a split view of the pipe 1104. As depicted, the cross section view 1102 may indicate a slice line 1106 through which the pipeline is split in the slit view. The slit view provides a view of the pipeline and provides defect locations 1108a, 1108b. Information 1110 associated with a defect, such as the date the defect started and its current maximum depth, may be presented to the user. The information may be presented when the user selects a defect, for example using a mouse, or interacts with the interface in other manners, such as hovering the mouse pointer over the defect. Additional textual information 1112, such as construction information, ILI inspection history and information on any previous visual inspections. It will be appreciated that the pipeline information, including graphical representations of defects may presented in numerous ways and the depicted interfaces are only described as illustrative examples.

As described above, systems and methods provide the ability to match defects across multiple ILI runs. Further, the ILI data may be positioned over an existing 3D model of the pipeline in order to provide a model of the pipeline that includes the defect information, which may provide a system to track and maintain pipelines. Although the above has described the systems and methods with regard to pipelines, it is contemplated that the same systems and methods may be applied to other areas including for example, maintaining roads, power line management, and other similar geographic related systems.

References to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A method for matching inspection data across multiple inspection runs of a pipeline, the method comprising:
receiving at a processing system new inspection data comprising:
a plurality of measurements taken by a pipe inspection gauge that measures magnetic flux leakage (MFL) along pipeline walls during an inspection run; and
a plurality of distances each indicative of a distance the pipe inspection gauge has travelled from a starting location within the pipeline when a respective measurement of the plurality of measurements was taken by the pipe inspection gauge;
determining detected signatures of relevant features comprising welds and valves of the pipeline within the received new inspection data and corresponding relevant features in a 3-dimensional (3D) model of the pipeline stored in a database system to position each of the plurality of measurements along a portion of the 3D model corresponding to a portion of the pipeline where the respective measurements were taken by the pipe inspection gauge;
determining one or more pipeline defects in the new inspection data corresponding to one or more existing defects in existing inspection data from a previous inspection run using the positions of the plurality of measurements of the new inspection data as positioned along the portion of the 3D model and the positions of the existing inspection data along the 3D model of the pipeline;
for each of the determined one or more pipeline defects corresponding to a respective existing defect of the one or more existing defects, linking the determined one or more pipeline defects in the new inspection data to the corresponding existing defect in the existing data from the previous inspection run; and storing the new inspection data and the links between identified defects and existing defects in the database system.

2. The method of claim 1, further comprising:
conforming the received new inspection data to a defined data format.

3. The method of claim 1, wherein determining the detected signatures of welds and valves of the pipeline and corresponding relevant features in the 3D model comprises for each detected signature of a weld or valve:
determining an initial location of the signature of the weld or the valve using distance information of the measurements used in identification of the detected signature of the weld or valve;
determining a distance between the initial location to a location within the 3D pipeline model of a potential weld or valve initially corresponding to the detected signature of the weld or valve; and
determining that the detected signature of the weld or valve corresponds to the potential weld or valve within the 3D pipeline model when the determined distance is less than a threshold distance for positioning corresponding features.

4. The method of claim 3, further comprising:
soliciting user feedback on the potential weld or valve when the determined distance is greater than, or equal to, the threshold distance.

5. The method of claim 1, wherein determining one or more pipeline defects in the new inspection data comprises:
determining corresponding defects in the new inspection data and the inspection data of the previous inspection run using a proximity of the defects to each other and depths of the defects.

6. The method of claim 5, wherein determining corresponding defects further comprises:
determining a deepest defect in a section of the new inspection data;
determining a deepest defect in a section of the previous inspection data within a matching distance limit of corresponding defects from the section of the new inspection data; and
determining that the deepest defect in the section of the new inspection data corresponds to the deepest defect in the section of the previous inspection data if a depth of the deepest defect in the section of the new inspection data is greater than or equal to a depth of the deepest defect in the section of the previous inspection data.

7. The method of claim 6, wherein determining corresponding defects further comprises:
determining the deepest defect in the section of the new inspection data to have grown from zero if the depth of the deepest defect in the section of the new inspection data is less than the depth of the deepest defect in the section of the previous inspection data.

8. The method of claim 1, further comprising:
querying the 3D pipeline model using 3D spatial coordinates;
receiving response data from querying the 3D pipeline model;
generating a user interface to display the response data.

9. The method of claim 8, wherein generating the user interface display comprises:
generating a 3D view of a split pipe view depicting defects specified the response data at a location on the split pipe view corresponding to a location of the defect in the 3D pipeline view.

10. The processing system of claim 1, wherein the determining the detected signatures of welds and valves of the pipeline and corresponding relevant features in the 3D model comprises for each detected signature of a weld or valve:
determining an initial location of the signature of the weld or the valve using distance information of the measurements used in identification of the detected signature of the weld or valve;
determining a distance between the initial location to a location within the 3D pipeline model of a potential weld or valve initially corresponding to the detected signature of the weld or valve; and
determining that the detected signature of the weld or valve corresponds to the potential weld or valve within the 3D pipeline model when the determined distance is less than a threshold distance for positioning corresponding features.

11. The processing system of claim 10, wherein the instructions, which when executed by the processing unit, further configure the processing system to:
solicit user feedback on the potential weld or valve when the determined distance is greater than, or equal to, the threshold distance.

12. A processing system for matching inspection data across multiple inspection runs of a pipeline, the system comprising:
a processing unit for executing instructions;
a memory unit for storing instructions, which when executed by the processing unit, configure the system to:
receive at a processing system new inspection data comprising:
a plurality of measurements taken by a pipe inspection gauge that measures magnetic flux leakage (MFL) along pipeline walls during an inspection run;
a plurality of distances each indicative of a distance the pipe inspection gauge has travelled from a starting location within the pipeline when the respective measurement of the plurality of measurements was taken by the pipe inspection gauge;
determine detected signatures of relevant features comprising welds and valves of the pipeline within the received new inspection data and corresponding relevant features in a 3-dimensional (3D) model of the pipeline stored in a database system to position each of the plurality of measurements along a portion of the 3D model corresponding to a portion of the pipeline where the respective measurements were taken by the pipe inspection gauge;
determine one or more pipeline defects in the new inspection data corresponding to one or more existing defects in existing inspection data from a previous inspection run using the positions of the plurality of measurements of the new inspection data as positioned along the portion of the 3D model and the positions of the existing inspection data along the 3D model of the pipeline;
for each of the determined one or more pipeline defects corresponding to a respective existing defect of the one or more existing defects, link the determined one or more pipeline defects in the new inspection data to the corresponding existing defect in the existing data from the previous inspection run; and store the new inspection data and the links between identified defects and existing defects in the database system.

13. The processing system of claim 12, wherein the instructions, which when executed by the processing unit, further configure the processing system to:

conform the received new inspection data to a defined data format.

14. The processing system of claim 12, wherein the determining one or more pipeline defects in the new inspection data comprises:

determining corresponding defects in the new inspection data and the inspection data of the previous inspection run using a proximity of the defects to each other and depths of the defects.

15. The processing system of claim 14, wherein the determining corresponding defects further comprises:

determining a deepest defect in a section of the new inspection data;

determining a deepest defect in a section of the previous inspection data within a matching distance limit of corresponding defects from the section of the new inspection data; and determining that the deepest defect in the section of the new inspection data corresponds to the deepest defect in the section of the previous inspection data if a depth of the deepest defect in the section of the new inspection data is greater than or equal to a depth of the deepest defect in the section of the previous inspection data.

16. The processing system of claim 15, wherein the determining corresponding defects further comprises:

determining the deepest defect in the section of the new inspection data to have grown from zero if the depth of the deepest defect in the section of the new inspection data is less than the depth of the deepest defect in the section of the previous inspection data.

17. The processing system of claim 16, wherein the instructions, which when executed by the processing unit, further configure the processing system to:

query the 3D pipeline model using 3D spatial coordinates;

receive response data from querying the 3D pipeline model;

generate a user interface to display the response data.

18. The processing system of claim 17, wherein generating the user interface display comprises:

generating a 3D view of a split pipe view depicting defects specified the response data at a location on the split pipe view corresponding to a location of the defect in the 3D pipeline view.

* * * * *